(12) United States Patent
Zhao et al.

(10) Patent No.: US 7,871,032 B2
(45) Date of Patent: Jan. 18, 2011

(54) HELICOPTER

(76) Inventors: Qin Zhao, Room 4-301, No. 21 Minhang Road, Haidian District, Beijing (CN) 100089; Ou Zhao, Room 4-301, No. 21 Minhang Road, Haidian District, Beijing (CN) 100089

( * ) Notice: Subject to any disclaimer, the term of this patent is extended or adjusted under 35 U.S.C. 154(b) by 0 days.

(21) Appl. No.: 12/245,777

(22) Filed: Oct. 6, 2008

(65) Prior Publication Data

US 2009/0032638 A1 Feb. 5, 2009

Related U.S. Application Data

(63) Continuation of application No. PCT/CN2007/000582, filed on Feb. 16, 2007.

(51) Int. Cl.
*B64C 27/16* (2006.01)
*B64C 27/22* (2006.01)

(52) U.S. Cl. .......................... 244/6; 244/17.19; 244/54; 244/55

(58) Field of Classification Search .............. 244/17.11, 244/17.19, 17.21, 17.23, 6, 54, 55; 416/129, 416/157 B, 99, 120, 125
See application file for complete search history.

(56) References Cited

U.S. PATENT DOCUMENTS

| | | | | | |
|---|---|---|---|---|---|
| 1,468,847 | A | * | 9/1923 | Vettel | 416/99 |
| 1,528,943 | A | * | 3/1925 | Naranjo | 244/17.17 |
| 1,550,106 | A | * | 8/1925 | Shaw | 244/7 A |
| 1,568,765 | A | * | 1/1926 | Ortego | 244/17.19 |
| 1,609,002 | A | * | 11/1926 | Severson | 244/7 A |
| 1,653,185 | A | * | 12/1927 | Kusse, Sr. et al. | 416/99 |
| 1,669,758 | A | * | 5/1928 | Vittorio et al. | 244/17.21 |
| 1,817,074 | A | * | 8/1931 | Glessner | 244/7 A |
| 1,922,167 | A | * | 8/1933 | Leray | 244/6 |
| 1,955,921 | A | * | 4/1934 | Kusse | 416/99 |
| 2,281,203 | A | * | 4/1942 | Pitcairn | 416/20 R |
| 2,585,468 | A | * | 2/1952 | Vittorio | 244/17.11 |
| 2,605,608 | A | * | 8/1952 | Barclay, Jr. | 60/243 |
| 2,689,011 | A | * | 9/1954 | Zakhartchenko | 416/135 |
| 2,717,043 | A | * | 9/1955 | Vittorio | 416/22 |
| 2,750,131 | A | * | 6/1956 | Thomson | 244/17.19 |
| 2,761,635 | A | * | 9/1956 | Hiller, Jr. et al. | 244/17.19 |
| 2,974,902 | A | * | 3/1961 | Schofer | 244/17.19 |
| 3,013,746 | A | * | 12/1961 | De Siebenthal | 244/17.11 |
| 5,297,759 | A | * | 3/1994 | Tilbor et al. | 244/17.11 |
| 5,454,530 | A | * | 10/1995 | Rutherford et al. | 244/7 A |
| 5,971,320 | A | * | 10/1999 | Jermyn et al. | 244/17.25 |
| 6,513,464 | B1 | * | 2/2003 | Busch | 123/65 VA |
| 7,014,142 | B2 | * | 3/2006 | Barocela et al. | 244/7 R |
| 7,093,788 | B2 | * | 8/2006 | Small et al. | 244/12.2 |
| 2004/0000614 | A1 | * | 1/2004 | Leyva et al. | 244/17.11 |

* cited by examiner

*Primary Examiner*—Tien Dinh
*Assistant Examiner*—Joseph W Sanderson
(74) *Attorney, Agent, or Firm*—Matthias Scholl P.C.; Matthias Scholl

(57) ABSTRACT

A helicopter that adopts a two-stroke internal combustion engine equipped with a centrifugal force-resistant propeller fan or fan turbine, or that can rotate clockwise (CW) and counterclockwise (CCW) during driving to directly propel the rotors and realize flight using a rotor wing that reconfigures into a hovering state. The helicopter reduces emissions via improved ventilation and a scavenging air system, reduces aerodynamic loss, reduces the access fee, and possesses the functions of a rotor wing that reconfigures into a hovering state.

20 Claims, 4 Drawing Sheets

HELICOPTER

CROSS-REFERENCE TO RELATED APPLICATIONS

This application is a continuation of International Patent Application No. PCT/CN2007/000582, with an international filing date of Feb. 16, 2007, designating the United States, now pending, which is based on Chinese Patent Application No. 200610072962.3 filed on Apr. 7, 2006 and Chinese Patent Application No. 200610168131.6 filed on Dec. 18, 2006. The contents of these specifications are incorporated herein by reference.

BACKGROUND OF THE INVENTION

1. Field of the Invention

The invention relates to the field of turbines, internal combustion engines, and aircraft, specifically to helicopters.

2. Description of the Related Art

U.S. Pat. No. 5,454,530 discloses a type of helicopter that is capable of vertical take-offs and landings, the rotor wing may be reconfigured into a hovering state, a turbofan engine with a low bypass ratio is adopted for the drive, and the engine propels the rotors to rotate and the aircraft to fly via production of hot airflow pressure. There are two pipes at jet nozzle of the turbine. One pipe makes a turn toward the flat passages inside the two rotors through a hollow shaft, followed by another turn toward the rotor tips, then directs airflow transversely. The other pipe leads directly to the tail vector or to a multidirectional nozzle, enabling steering and attitude control. When the aircraft reaches a certain altitude and speed, the hot airflow pressure to the rotors is obstructed and the jet flow reverses. Hovering flight is enabled if the rotors rotate at very low speeds. The helicopter made pubic by the US patent document can also be equipped with two drive devices at the roots of each of the two rotors. The lift force is provided by directing the airflow generated by the drive devices transversely after the airflow makes a turn toward the flat passages inside the rotors, followed by another turn to rotor tips. The disadvantages are that only a turbofan engine with a low bypass ratio can be adopted; the hot airflow pressure loses heat, loss of airflow occurs at the corners, and the fuselage imposes aerodynamic drag on the rotors, imposing a thrust loss of 30% in total; due to the high temperature of more than 100° C., the diameter of the rotor is decreased to guarantee reliability. This results in problems such as the rotor area load and a high access fee. The greatest disadvantage of the helicopter made public by U.S. Pat. No. 5,454,530, is that the propeller fan or fan turbine and internal combustion engine are not accepted as drive.

Another US patent (U.S. Pat. No. 6,513,464) discloses a type of two-stroke internal combustion engine that is suitable for installation on the rotor at a distance from the roots. It can directly propel the rotors to rotate, and its advantages are that stratified lean combustion and low discharge can be realized. The disadvantages are the low power-to-weight ratio and the complex structure.

SUMMARY OF THE INVENTION

In view of the above-mentioned drawbacks of existing designs, the purpose of this invention is to provide a type of helicopter that adopts a two-stroke internal combustion engine equipped with a centrifugal force-resistant propeller fan or fan turbine, or that can rotate clockwise (CW) and counterclockwise (CCW) during driving to directly propel the rotors and realize flight using a rotor wing that reconfigures into a hovering state.

Another purpose of this invention is to provide a type of helicopter that reduces emissions via improved ventilation and a scavenging air system, reduces aerodynamic loss, reduces the access fee, and possesses the functions of a rotor wing that reconfigures into a hovering state.

To achieve the above objectives, in accordance with one embodiment of the invention, provided is a helicopter that can directly propel rotors into the hovering state with drive, comprising a fuselage (13), a rotor (5) with a pull rod and jackstay (2), a turbine (1), a pair of wings (14), a hollow short shaft (37), a hollow short dead axle (36) with a bearing and a base (7), a plurality of throttle lines (35), a plurality of wires (34), a fuel delivery pipe (30), a hydraulic system, an axle sleeve (4) and a root axle (3), wherein the centrifugal force-resistant turbine (1) directly drives the two symmetrical blade rotors (5), the turbine (1) is installed on the hollow short shaft (37), the hollow short shaft (37) is installed inside the hollow short dead axle (36), the hollow short dead axle (36) is fixed beside a root of the rotor (5), the hydraulic system controls the propulsion direction of the turbine, the throttle lines (35), wires (34), and fuel delivery pipe (30) pass through the hollow short shaft (37) and are received by a crossbeam of the rotor, the axle sleeve (4) of the rotor is installed on the hollow dead axle (36) and hinged with the root axle (3) and the pull rod and jackstay (2), the base (7) is fixed on the back of the center of gravity of the fuselage (13), pipelines lead underneath the base and connect to a control system, and steering, outward pushing, positioning, and propulsion control is provided by a drive under the wings (14) or the fuselage (13).

In certain embodiments of the present invention, the root axle (3) is concentric with an inner axle of a crossbeam of the rotor and hinged with the axle sleeve (4); one end of the pull rod and jackstay (2) is hinged using an axle in the crossbeam of the rotor and the other side thereof is hinged using the lower part of a pull rod and jackstay (2) and is installed on the base (7).

In certain embodiments of the present invention, a pitch-changing rotor lock (11) is disposed on sections of the sliding keys at the bottom of the axle sleeve (4); a locking embedded key (9) is disposed in the bottom of the axle sleeve (4); a key slot segment (12) with increased diameter corresponding to the locking embedded key (9) is installed on the base (7) and is locked by a control system of the plectrum plate; slip rings and chute systems are disposed on the external cylindrical sections of the pitch-changing rotor lock (11); the pitch-changing lock that can slide up and down is controlled by the control system of the shifting fork or a clamping-type shifting fork.

In certain embodiments of the present invention, the turbine (1) is fixed by a short shaft system; the turbine (1) on the sides of the rotor roots steers via a hydraulic system and functions by adjusting and impelling the direction of the helicopter. The connection and control principle is as follows: the under-parts between the two rotors (5) form the base of the hollow dead axle (7) and a rotary fuel delivery pipe (15); a protection pipe (10) is also passed through to be interlinked with the axle sleeve (4); throttle wires, wires, and the turbine (1) steer the pulling wire of the hydraulic valve or gas mixture pipe of the internal combustion engine (1); the throttle wire, etc., lead underneath the base; the protection pipe (10) is uncovered using a key slot segment (12); wires are connected to a slip ring and are conducted by a clamping-type shifting fork control or a pressure carbon brush; the rotary fuel delivery pipe (15) is connected to a connector of the rotary fuel delivery pipe (6). If the rotary fuel delivery pipe (15) is a rotary pipe of the gas mixture, the carburetor is equipped below this position to realize fuel transport and functional control.

In certain embodiments of the present invention, steering of the turbine (1) by the rotors or pitch-changing of the propellers is driven by the pressure of the fuel delivery pump and is controlled by a hydraulic valve; the hydraulic tank is driven by the pressure of the fuel delivery pump to enable the centrifugal force-resistant propeller fan or fan turbine (1) to control the propulsion direction while the rotor (5) changes into a hovering state, so that pitch changing of the propellers may be realized.

In certain embodiments of the present invention, the turbines (16) on either side of the wings shield the rotor (5) purling via surfaces of the wings (14); the turbines (16) on either side of the wings are staggered with air stream on a surface of the drive (1) of the rotor (5).

In certain embodiments of the present invention, the air stream on the wings (14) or fuselage drive (16) blows over the horizontal empennage and provides propulsion, propulsion in a reverse direction, steering, and positioning to realize posture control and flying while the rotors reconfigure into a hovering state.

In accordance with another embodiment of the invention, provided is a helicopter that directly reconfigures the rotors into a hovering state with drive comprising a fuselage (13), a two symmetrical blade rotor (5), a pair of wings (14), a propeller with CW and CCW rotational functions, a two-stroke low-emission internal combustion engine, a plurality of throttle wires (35), a plurality of wires (34), a curling fuel delivery pipe (30), a root axle (3), an axle sleeve (4), a hollow dead axle (21) with a bearing, and a base (7), wherein the propeller with CW and CCW rotational functions and the two-stroke low-emission internal combustion engine are directly fixed beside the root of the rotor (5) and directly drive the two-symmetrical blade rotor (5); the throttle wires (35), the wires (34), and the curling fuel delivery pipe (30) pass through a crossbeam and are received by the root axle (3) of the rotor; the axle sleeve (4) is installed on the hollow dead axle (21) and hinged with the root axle (3), the base (7) is fixed on the back of a gravity center of the fuselage (13), pipelines lead underneath the base and are connected to a control system; steering, positioning, and propulsion control are provided by a drive under the wings (14) or the fuselage (13).

In certain embodiments of the present invention, the internal combustion engine provides lean combustion for the stratification of the two-stroke engine, a pair of one-way air valves (17) is disposed on a scavenging port (43) and an air passage (20) on both sides, a check valve for the gas mixture (18) is disposed at the center of a long mid-way air passage (19), and in the vicinity of the one-way air valve (17), each air throttle of the one-way air valve (17) is coupled synchronously to that of the check valve for the gas mixture (18) to shield the gas mixture with air in the cylinder; an air filter is installed outside the unidirectional air valve.

In certain embodiments of the present invention, the leaked or residual fuel is directly transmitted to the inlet of the air compressor or to interval sections in front of the air compressor and the combustor after injection, so as to burn the residual fuel in the internal combustion engine.

In certain embodiments of the present invention, the fuel is directly injected into the cylinder of the internal combustion engine, and small amounts of fuel that leak from the coupled parts of the nozzle are directed to a scavenging duct through the oil pipe.

In certain embodiments of the present invention, a stub wing (44) is directly fixed on the rotor head (47).

In accordance with a further embodiment of the invention, provided is a helicopter that includes direct propulsion of the rotors, comprising a centrifugal force-resistant turbine or an internal combustion engine (1), a rotor (5), a pair of symmetric stub wings (44), a rotor head (47), an automatic tripper (46), and a pitch-changing connecting rod (45), wherein the centrifugal force-resistant turbine or the internal combustion engine (1) is fixed on the rotor (5) or the symmetric stub wings, the stub wings (44) are fixed on the rotor head (47) to enable operation of the rotor (5), the automatic tripper (46) and the pitch-changing connecting rod (45) are disposed therebetween to permit operation.

In certain embodiments of the present invention, a stub wing (44) is wrapped around a root axle extending from the rotor (5), so that transmissions from the automatic tripper (46) are transmitted to the rotor root axle (3) via the pitch-changing connecting rod (45).

In certain embodiments of the present invention, a stub wing (44) is supported by one end of the pull rod and jackstay (2), and the other end thereof is connected to an axle sleeve below the rotor head (47).

In certain embodiments of the present invention, the propeller-equipped centrifugal force-resistant internal combustion engine (1) is fixed to the sides of the root axle (3) and hinged on the root axle (3) via one end of the pull rod and jackstay, and the other end is hinged such that the axle sleeve rotates along with the rotor (5).

In certain embodiments of the present invention, a hanging seat (49) in the cabin of the super-light helicopter (51) is disposed below the hollow dead axle (21) to realize accurate positioning in the air by transferring the center of gravity through the strength of the hands and feet of the driver and passengers.

In certain embodiments of the present invention, the propeller-equipped centrifugal force-resistant internal combustion engine (1) is fixed directly on the side of the root axle (3), and the working angle of the rotor (5) is controlled by a pitch-changing device that realizes pneumatic control.

In certain embodiments of the present invention, a controllable positioning pin (53) is installed below an entirely rigid hanging seat (49) and is locked to a floor pin hole (48) of the super-light helicopter (51) after VTOL.

The helicopter's direct propulsion rotors in the hovering state under drive are propelled via CW and CCW rotation, and the two-stroke low-emission internal combustion engine is directly fixed beside the roots of the rotors to directly drive the two-symmetrical blade rotor. The throttle wire, wire, and curling fuel delivery pipe pass through the crossbeam to the root axle of the rotors; the sleeves of the rotors are installed on the hollow dead axle with a bearing and are hinged with the root axle of the rotors; the base of the hollow dead axle is fixed on the back of the fuselage's gravity center; the pipeline leads underneath the base and connects with the control system; steering, positioning, and propulsion control are provided by the drive under the wings or fuselage to constitute a helicopter that is capable of vertical take-offs and landings and which includes a rotor wing that may be reconfigured into a hovering state.

Reconfiguration of the helicopter's direct propulsion rotors to the hovering state under drive characterized by fixing the propeller-equipped centrifugal force-resistance turbine or internal combustion engine on the symmetric stub wings between the rotors. The stub wings are fixed on the rotor heads, allowing the rotors, automatic tripper, and pitch-changing connecting rod between them to work normally.

Accurate positioning in the air is realized by means of a control method that shifts the center of gravity.

The above-mentioned structures are also applicable to helicopters having no empennage.

In the attached Figs.: 1. Drive; 2. Pull rod and jackstay; 3. Rotor root axle; 4. Axle sleeve; 5. Rotor; 6. Connector of the rotary fuel delivery pipe; 7. Base of the hollow dead axle; 8. Slip ring; 9. Locking embedded key; 10. Protection tube; 11. Pitch-changing rotor lock; 12. Key slot segment; 13. Fuselage; 14. Wing; 15. Rotary fuel delivery pipe; 16. Turbine for fixed wings or fuselage drive; 17. One-way air valve; 18. Check valve for the gas mixture; 19. Mid-way long air passage; 20. Air passages at both sides; 21. Hollow dead axle; 22. Connector for the rotary fuel delivery pipe; 23. Elastic plectrum plate; 24. Shifting fork of the pitch-changing lock; 25. Electric slip ring; 26. Electric carbon brush; 27. Shifting fork of the pulling wire; 28. Slip ring seat; 29. Chute; 30. Curling fuel delivery pipe; 31. Pulling wire of the hydraulic valve; 32. Residual fuel tank; 33. Hydraulic valve; 34. Wire; 35. Throttle wire; 36. Hollow short dead axle; 37. Hollow short shaft; 38. Hydraulic gear rack; 39. Steering gear; 40. Residual fuel pipe; 41. Fuel delivery tap; 42. Turn; 43. Scavenging air duct; 44. Stub wing; 45. Pitch-changing connecting rod; 46. Automatic tripper; 47. Rotor head; 48. Pin hole; 49. Hanging seat; 50. Helicopter with automatic tripper; 51. Super-light helicopter; 52. Pitch-changing device; 53. Positioning pin.

DETAILED DESCRIPTION OF THE INVENTION

Combined with the accompanying figures, the following is a more detailed explanation for the structure a type of helicopter that reconfigures the rotor wing into a hovering state of this invention.

Figure 1:
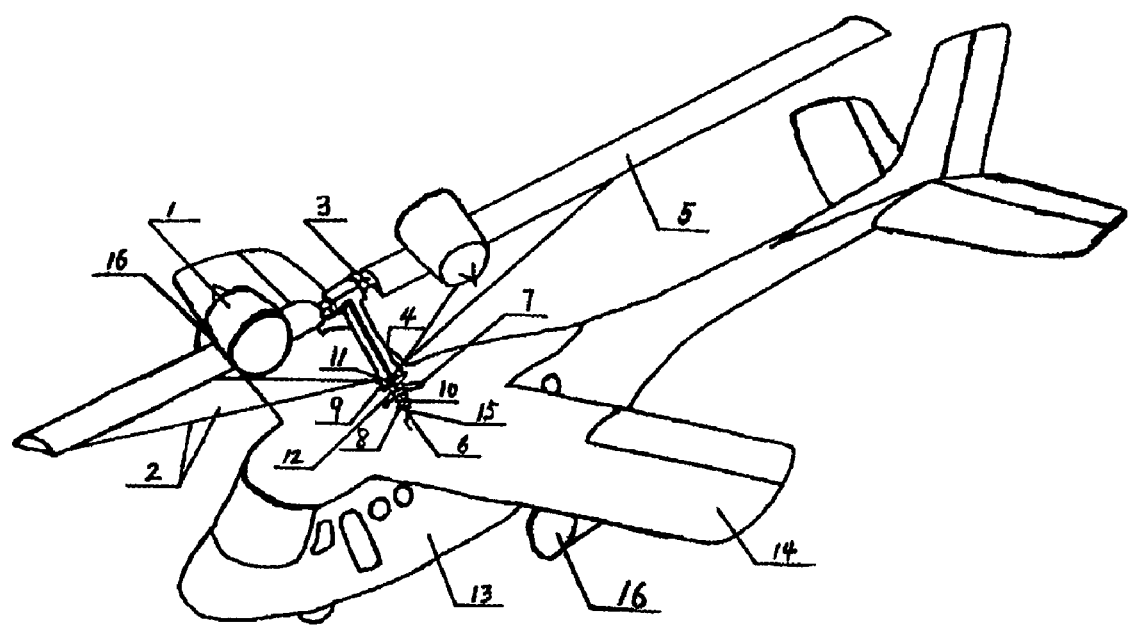
FIG. 1 shows the structural diagram of example 1 implemented by this invention, a helicopter that adopts a turbine to propel the rotors and reconfigure the rotor wing into a hovering state.
Figure 2:
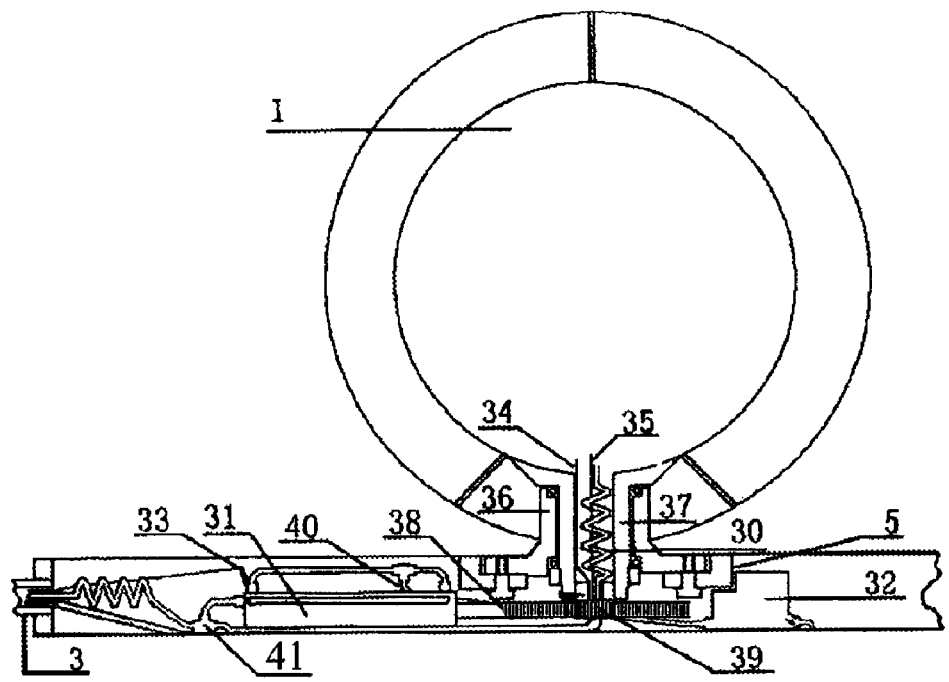
FIG. 2 shows a structural diagram in which turbines of the helicopter are mounted on the rotors.

As shown in FIG. 1, the invention adopts the turbine 1 as a drive device for the purpose of changing the rotor wing into the hovering state. As shown in FIGS. 1 and 2, the turbine 1 is installed on the hollow short shaft 37, which is mounted in the hollow short dead axle 36; the steering gear 39 is fixed under the hollow short shaft 37 and is coordinated with the hydraulic gear rack 38 to realize steering after changing the rotor wing into the hovering state. Throttle wire 35, wire 34, and the curling fuel delivery pipe 30 are threaded through the central hole of the steering gear 39 and their ends are connected to the turbine. The other end of wire 34 is connected to the cab through the slip ring 25 and the carbon brush, while the throttle wire 35, which passes through the slip ring seat 28, is connected to the cab by the shifting fork of the pulling wire 27. The other end of the fuel delivery pipe 30 is connected to the connector of the rotary fuel delivery pipe 22. The residual fuel drained during steering disembogues into the residual fuel tank 32 through the residual fuel pipe 40 and then is discharged when the helicopter lands. The rotor root axle 3 is hinged with the axle sleeve 4 on the sleeve's top. The inner shaft of the rotor beam is hinged with the pull rod and the jackstay 2, which is hinged with the axle sleeve 4 at the lower part of the sleeve.

Figure 3:
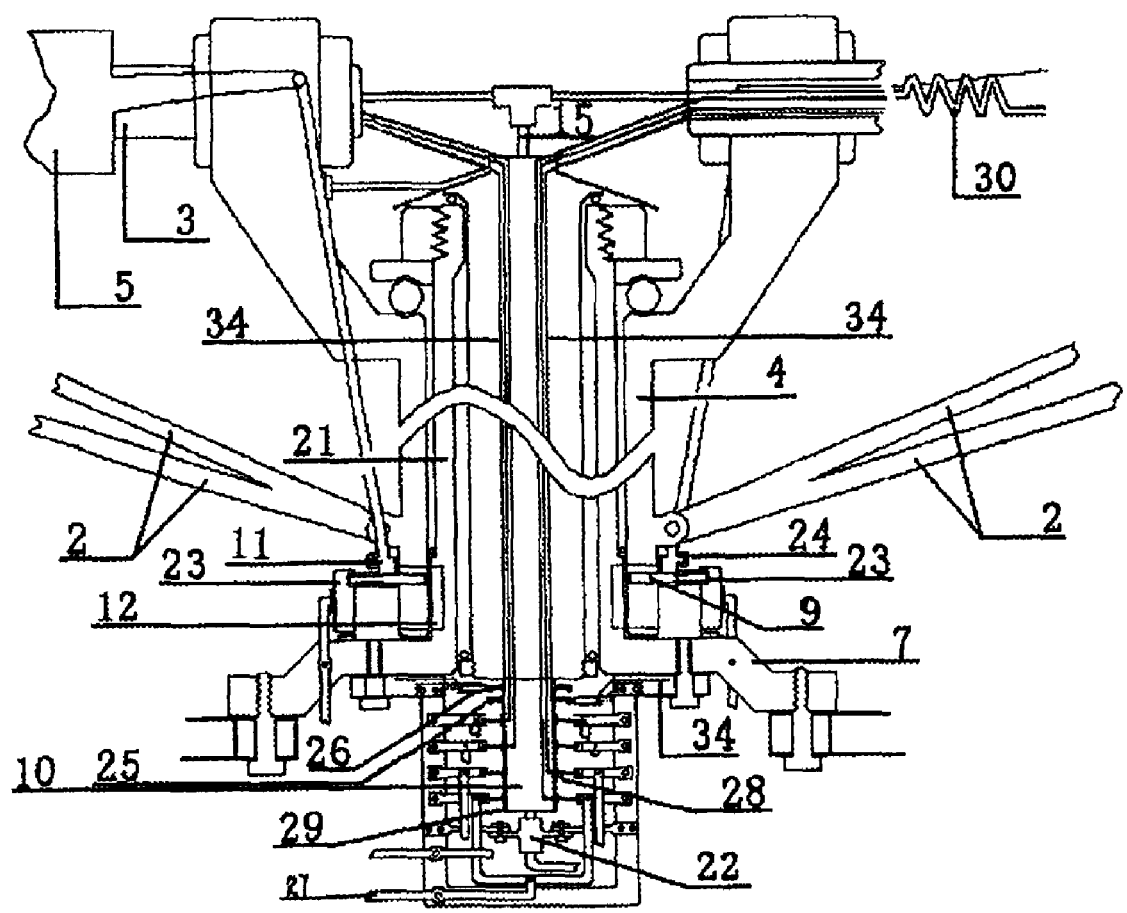
FIG. 3 shows the structure diagram of the shaft system that connects the rotors and fuselage of the helicopter shown in FIG. 1.

As shown in FIGS. 1 and 3, the axle sleeve 4 is installed on the hollow dead axle 21 with bearing disposed therein and is fixed on the back of the fuselage's center of gravity with the base of the hollow dead axle 7. The protection tube 10 of the rotary fuel delivery pipe 15 is fixed on top of the axle sleeve 4. The wall of the protection tube is embedded with the throttle wire 35, the wire 34, and the pulling wire of the hydraulic valve 31, which are together led underneath the base of the hollow dead axle 7 through the hollow dead axle 21. The exposed part of the protection tube 10 is set with the electric carbon brush 26, which overlaps the slip ring 8, which is connected to the wire 34, the throttle wire 35, and the pulling wire of the hydraulic valve 31. The sling ring seat 28 under the slip ring 8 can slide in the chute 29 and can be controlled using a clamping-type shifting fork of the pulling wire 27. The rotary fuel delivery pipe or the heavy gas mixture pipe 15 is disposed under the protection tube 10 and is connected to the connector of the rotary fuel delivery pipe 20. Helical circling and curling fuel delivery pipes 30 are disposed in the rotors and short shafts. The invention adopts the following propulsion convention: CCW propulsion and outward pushing functions of the turbine 16 under the wings achieve positioning, steering, and moving transversely and in the forward direction. Set on the upper end of the base of the hollow dead axle, the key slot segment 12 corresponds with the locking embedded key 9 in the bottom of the pitch-changing rotor lock 11, which encases the key slot segment 12 at the bottom of the axle sleeve. Operation of the locking embedded key 9 is realized by the shifting fork of the pitch-changing lock 24, which controls the elastic plectrum plate 23.

FIGS. 1-3 show the helicopter structure diagram of this invention, which utilizes the turbine 1 as the drive device to propel rotors and reconfigure the rotor wing into the hovering state. The invention can employ a two-stroke low-emission internal combustion engine with CW and CCW rotation functions as the drive device.

Figure 4:
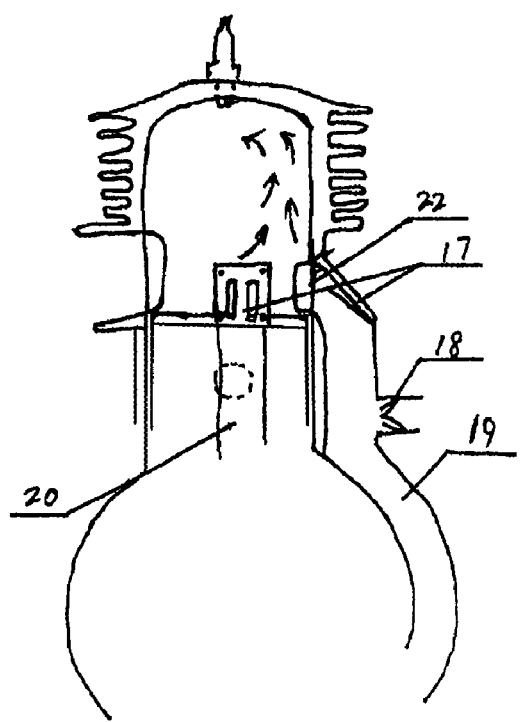
FIG. 4 shows the structural diagram of example 2 implemented by this invention: a helicopter that uses a two-stroke internal combustion engine to propel the rotors and reconfigure the rotor wing into a hovering state.

FIG. 4 shows the helicopter structure diagram of this invention, which adopts a two-stroke low-emission internal combustion engine to the propel rotors and change the rotor wing into the hovering state.

Figure 5:
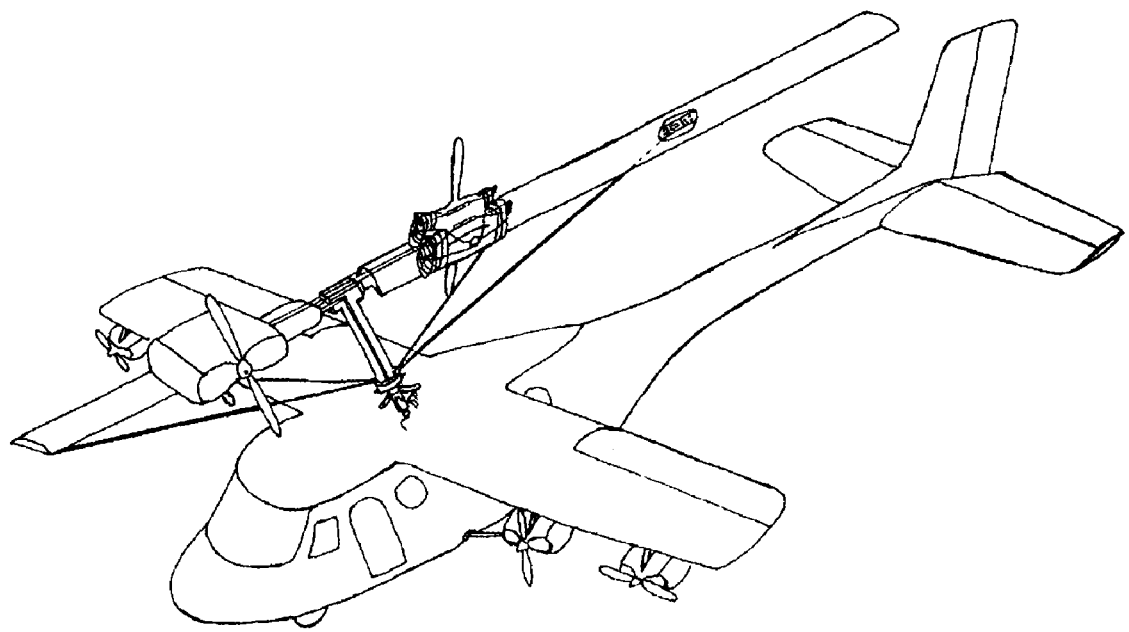
FIG. 5 shows the structural diagram of the internal combustion engine's scavenging air system of this invention.

To make the two-stroke low-emission internal combustion engine more applicable to a helicopter in which the rotor wing may be converted into the hovering state, the inventor has made the following improvements on the two-stroke low-emission internal combustion engine. As shown in FIG. 5, the scavenging air duct 43 and the air passages at either side 20 of the two-stroke low-emission internal combustion engine are installed with a one one-way air valve 17; the check valve of the gas mixture 18 is installed at the middle-upper part of the mid-way long air passage 19 and at the position near the one-way air valve 17. The throttles of all one-way inlet valves 17 are controlled simultaneously using the check valves of the gas mixture 18. During ventilation, fresh air pushes air along with engine oil or the gas mixture in the air passage 20 into the pump air chamber. In the process of scavenging, air near the scavenging air duct 43 is given priority and is followed by air with low levels of engine oil or gas mixture; thereby, the escape of air mixed with engine oil or gas mixture is prevented. In this way, during scavenging, air will shield the gas mixture, which will then form an approximately ideal mixing state and realize lean combustion.

Additionally, during installation, the to-and-fro movement of the piston of the two-stroke low-emission internal combustion engine is parallel to the direction of the centrifugal force. The air filter can be mounted outside the one-way inlet valve.

The design principle of this invention is that the centrifugal force-resistant propeller fan or fan turbine is fixed on the hollow short shaft installed inside the hollow short dead axle; the leakage or small amounts of residual fuel from the fuel-spraying system of the propeller fan or fan turbine are directed into the air compressor and then to the area between the burners; the base of the dead axle is fixed tightly on the beam beside the rotor roots and is kept certain distance from the roots; the fuel delivery pipe of the turbine curls and circles many circuits inside the hollow short shaft; the fuel delivery pipe, throttle wire, and wire all pass through the central hole of the gear fixed under the hollow short shaft and are conducted to the rotors; along with the coordination between the gears and the gear rack, turbine steering during reconfiguration of the rotor wing into the hovering state can be realized depending on the hydraulic drive. The fuel delivery pipe from the rotor roots shall adopt a helical circling and curling shape to avoid damage during the pitch changing motions of the rotors; a branch joint in the fuel delivery pipe is provided and is connected to the turbine and the hydraulic steering, which is controlled by a valve; the residual fuel drained is disembogued into the residual fuel tank and then discharged after the helicopter lands. On the side of each of the roots of the two-symmetrical blade rotor are installed CW turbines, one to each rotor; the fuel delivery pipe, steering valve, throttle wire, and wire are led along the beam to the sleeve of the rotor root axle. Together they penetrate through the hollow dead axle with the protection tube position interlinked with the axle sleeve underneath the base; the protection tube is interlinked with the axle sleeve. The rotor root axle is concentric with the axle inside the rotor beam; the rotor root axle is hinged with the upper end of the axle sleeve; the pull rod and jackstay are hinged with the axle inside the rotor beam, which is concentric with the rotor root axle; the other end of the pull rod and jackstay is hinged with the lower end of the axle sleeve, which is installed on the hollow dead axle, the base of which is fixed tightly on the back of the fuselage's gravity center. The root of the base of the dead axle is provided with a key slot segment of larger diameter, the corresponding position of which is the bottom of the rotors' pitch-changing lock installed at the bottom of the axle sleeve; a key is embedded inside, and locking of the embedded key is controlled by the elastic plectrum plate. The pitch-changing rotor lock can slide up and down on the sleeve segment; a slip ring on the external cylindrical section of the sleeve segment is controlled by a clamping-type shifting fork; an exposed protection tube at the lower part of the base of the hollow dead axle is equipped with a slip ring connected to a wire and overlapped by a carbon brush. A moving slip ring is installed in the key slot segment of the protection tube and is connected to the throttle wire or pulling wire of the steering valve of the turbine. One pair or two pairs of servo rotor blades without drive are installed between the two rotors with drive; performance of the aerodynamic lift is thereby ensured.

In the case in which a two-stroke CW and CCW rotating internal combustion engine is applied to the rotation of the propellers and to the rotor propulsion, the propeller is capable of rotating CW and CCW; the internal combustion engine is fixed on the rotors; the to-and-fro movement of the piston is parallel to the direction of the centrifugal force. An air filter may be mounted outside the one-way inlet valve. The one-way inlet valve is positioned at the scavenging air duct, rendering the direct injection internal combustion engine in the tank capable of using the sucked air to push the air with the engine oil from the pipe into the pump air chamber; in the process of scavenging, air near the scavenging air duct is given priority, followed by air with small amounts of engine oil, thereby preventing escape of the gas mixture with engine oil; the drive for fuel spraying in the tank can lead small quantities of leaked fuel at the parts in which the nozzle of the fuel pipe is coupled to the scavenging air pipe; the idle speed adopts a method for stopping the fuel spraying in parts of the tanks; an electromagnetic igniter and propellers on the rotors are capable of rotating CW and CCW. A pitch-changing propeller is driven by the pressure of the fuel delivery pump and pitch changing is realized by valve control; all wires and pipes pass through the hollow dead axle; a protection tube covers the fuel pipe; all control wires are embedded in the wall of the protection tube and are led underneath the base. In case of the carburetor-type two-stroke CW and CCW rotating internal combustion engine fixed on the rotors, a one-way inlet valve is also installed at the scavenging air duct; the check valve for the mixture gas is installed at the middle-upper part of the mid-way long scavenging air pipe and at the near the side of the one-way air valve; throttles of all one-way inlet valves 17 are controlled simultaneously with the valves for the mid-way heavy mixture gas. Utilizing the shielding method, no mixture gas can escape during scavenging, and lean combustion is realized. A thicker pipe for the heavy gas mixture, a protection tube, and a control wire also pass through the hollow dead axle with a base connected to the rotary connector of the carburetor; the rotary branch joints of the mixture gas are positioned at the rotor root axle and led to the internal combustion engines in the two rotors.

The hollow dead axle of the above-mentioned lift system is installed on the back of the fuselage's gravity center; turbines under the main wings at either side are capable of CCW propulsion and outward pushing; the propellers of the piston and turbine function during both positive and negative pitch changes. Airflow passes horizontally with respect to the empennage and provides steering and positioning after the helicopter takes off. In the case of a turbine drive, after take-off, the drive controls the direction and take-off, whereas the helicopter flies forward until its wings have drive; subsequently, the centrifugal force-resistant propeller fan or fan turbine is throttled down; when rotation is very slow, the rotors are locked aslant; the CCW propeller fan or fan turbine draws the hydraulic valve at a small angle, the CW propeller fan or fan turbine draws the hydraulic valve, and both rotate at a small angle; at the same time, pitch changing of the rotors is propelled to the zero position. The engine is throttled up after all propulsion mechanisms are set to CW and are straight, inducing a tilted hovering wing and a subsonic airplane comprising a subsonic helicopter. During vertical landing, the height is maintained first and the velocity is reduced; the propeller fan or fan turbine on the rotors are throttled down, the CCW propeller fan or fan turbine are rotated to the original position, and the locking embedded key is released; the CW propeller fan or fan turbine returns to the original position and one or the other is throttled up; when the rotating speed of the rotors is relatively high, the pitch-changing device is lifted and a safe landing can then be achieved using the turbines with CCW rotation and an outward pushing function under the wings at both sides of the helicopter to coordinate the position. If a runway is available, the mode of the locking rotors may be set to horizontal or tilted so that the helicopter may directly take off/land through running In case of the CW and CCW internal combustion engine driving rotors, the traditional pull weight ratio can induce the helicopter to take off by the drive lift system using propellers and positioning; steering and propulsion are realized by the drive-controlled propellers under the wings through positive and negative pitch changing. During vertical take-off, when the lift obtained by the wings reaches a certain level, the fuel supply to the internal combustion engines on the rotors is cut; at this time, the helicopter is propelled only via drive from the wings; locking shall be done if the rotors rotate very slowly, and rotor pitch changing is pushed to the zero position, positioning the rotors transversely on the fuselage; they shall then be throttled up, inducing the windmill-like propellers to immediately generate propulsion drive, and the work will be performed both positively and negatively. In the process of a vertical landing, the drive on the rotors is throttled down and the throttle of the CCW drive is closed; the drive is throttled up after the locking is released; when the rotors are propelled to rotate at a low velocity by CW drive and the CCW drive is switched to CW rotation from the CCW rotation under the effect of airflow, two drives on the rotors are throttled up and the rotor pitch changing is lifted, realizing helicopter's landing. If one drive device on the rotors has trouble in air, a vertical landing may realized using the single drive on the rotor by controlling the CW propeller with a propeller pitch-changing valve and by utilizing the ground effect; the landing also can be realized by changing into the hovering state and gliding.

The propulsion drive of the rotors and of the fixed wings is stratified. The comprehensive performance is better when the diameter of the rotor is about 40% larger than the wingspan of the wings. For rotors adopting the internal combustion engine as a propulsion drive, one or more internal combustion engines are available for each blade to together drive a set of propellers that may rotate both CW and CCW. No matter how the propulsion drive of the fuselage or fixed wings is installed, the airflow must be directed to blow over the horizontal empennage to control the flying attitude. Turbines at both sides of the helicopter utilize the wing surface to obstruct the rotor purling and they are staggered with the airflow plane of the rotor drive. Overlap of small parts is acceptable between the airflow plane of the propellers at both sides of the fuselage and that of the propellers on the rotors.

The above-mentioned technological scheme permits this invention to adopt a turbine fan or propeller fan for the drive, and the pull rod and jackstay reduce the rotor area load so that it does not increase the weight fraction of the rotor or increase the take-off weight; the invention reasonably allocates drives, avoids aerodynamic drag loss on the rotors due to heat dissipation of the pressurized hot airflow, corner flow, and fuselage, and maintains a traditional aerodynamic configuration of the airplane.

While using a piston two-stroke internal combustion engine that can rotate CW and CCW as a drive source, one or more set(s) of internal combustion engine(s) could be applied on each blade to provide common drive to one set of the propellers, and the propellers could operate CW and CCW. Under the premise of maintaining the power to weight ratio, an air filter and a muffler could be installed, which are capable of achieving lean combustion; the thermal load is thereby reduced. Furthermore, a scavenging short circuit issue is solved by improving the position of the one-way inlet valve; by installing an equipped propeller on the rotor, variations in the weight of the rotor during reconfiguration into the hovering state helicopter could reach ⅓, and the continuously rotated rotor could be driven directly to give rise to a single rotor helicopter that may be priced relatively low and is practical, with a weight variation of 50%.

The single axial method that uses the hollow dead axle, axle sleeve, and servo protection pipe, as well as a tilt-rotor helicopter design with higher stability than that of the two rotors, are adopted in this invention; the pipelines of the drive are passed through the axle to transport fuel and control drive; excluding the tripper, tail transmission and tail propeller of the traditional helicopter, the service life and comfort level are naturally doubled, and the operating cost could be reduced by several factors; both super-light helicopters and super-heavy helicopters are useful for industrial manufacturing; the lateral air stream on the rotors is composed of vortex ring resistance functions; therefore, it realizes the objective of being safe, economic, practical, convenient, and highly efficient.

Considering that no automatic tripper is present and that the tilting of the helicopter may not be controlled by means of shifting the center gravity in helicopters that propel rotors directly by the drive published in the complementation examples I and II above, problems, such as weak side-wind resistance performance, accurate positioning in the air, easily arise in helicopters that propel rotors directly by drive.

Figure 6:
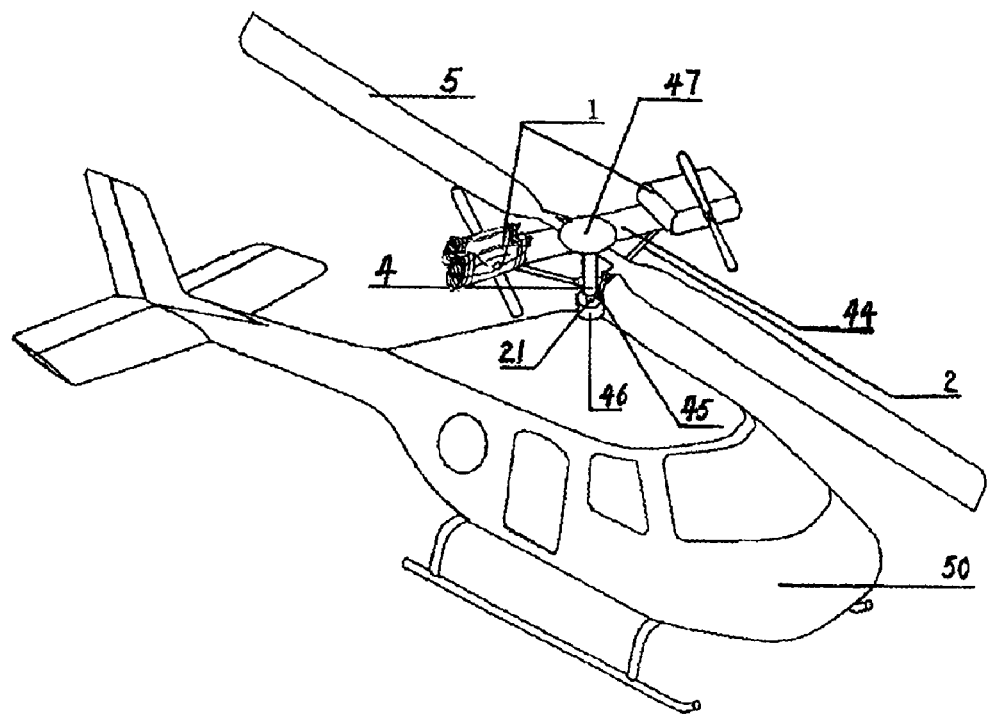
FIG. 6 shows the structural diagram of example 3 implemented by this invention: a helicopter that is equipped with an automatic tripper and directly propels the rotors with drive.
Figure 7:
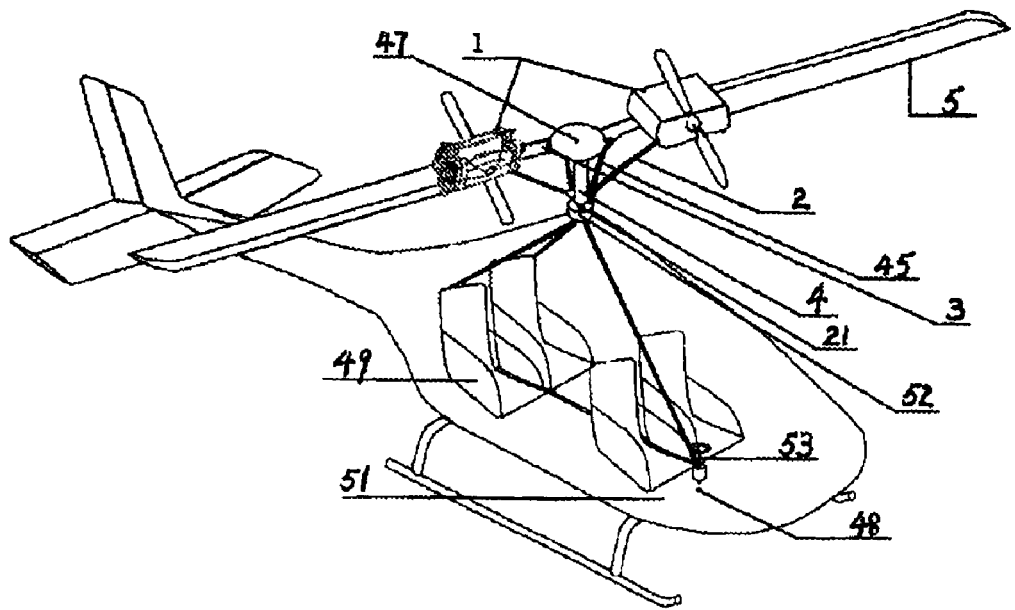
FIG. 7 shows the structural diagram of example 4 implemented by this invention, a super-light helicopter that directly propels the rotors with drive by means of the control method of shifting the center of gravity.

As shown in FIG. 6, in this invention, the propeller-equipped centrifugal force-resistant turbine or internal combustion engine 1 is fixed on the symmetric stub wings 44 between the rotor 5; stub wings 44 are fixed on the rotor head 47 to realize the joint normal working of the rotors 5 and the automatic tripper 46; the stub wing 44 could also be wrapped outside the extended symmetric rotor root axle 3 of the symmetric rotor 5 (as shown in FIG. 7), the head of which applies formation sealing composed of an elastic material to seal the ventilation volume around the rotor root axle so as to reduce pneumatic resistance. There is an opening at the pull rod 45 that transfers the transmission of the automatic tripper 46 to the rotor root axle 3 through a pitch-changing connecting rod 45 so that the system works normally. Driving devices, such as turbines and internal combustion engines used in this type of helicopter that have an automatic tripper 50, are equipped with a lubricant tank. While the drive is operating, it provides the engine pump of the turbine or internal combustion engine with lubricant; the lubricant tank may be installed in the stub wing 44 or at the rotor root axle 3 of the rotor 5.

As shown in FIG. 7, in this invention, the propeller-equipped centrifugal force-resistant internal combustion engine 1 is fixed on the sides of the rotor 5 root axle 3 on the super-light helicopter 51, and is equipped with a pull rod and a jackstay 2, one end of which is hinged with the rotor root axle 3 and the other end of which is hinged with the axle sleeve 4 that rotates along with the rotor 5. The working angle of the rotor 5 is controlled by a pitch-changing device 52. In the cabin of the super-light helicopter 51 is positioned the entire hanging seat 49 that is hoisted under the hollow dead axle. During VTOL, accurate positioning in the air is realized by shifting the center of gravity by the strength of the driver and passengers' hands and feet. A controllable positioning pin 53 and pin holes 48 are installed under the entirely rigid hanging seat. The flying posture may be controlled by the tail wings after VTOL, however, the flying posture blocks the positioning pin 53 on the floor of the super-light helicopter 51.

The design principle employed in realizing control and accurate positioning in the air in the implementation examples of III and IV in this invention is: a centrifugal force-resistant propeller fan, fan turbine, or propeller of the internal combustion engine are fixed on the stub wing, which is fixed on the rotor head; the fuel delivery pipe of the drive, mixture gas pipe, throttle wire, etc., lead from the stub wing to the rotor head along the inner hollow dead axle to the underside of the base and act in concert with the control devices. An automatic tripper is installed outside the hollow dead axle, which acts in concert with the pitch-changing rod on the rotor roots. The stub wing is supported by one side of the pull rod and jackstay, the other side of which is connected to the axle sleeve that moves along with the rotors. Under the premise of maintaining dynamic balance, the rotor blades are evenly arranged in a two-blade symmetric or a multi-blade symmetric manner. The tub wing may also be fixed directly on the rotor head without using the pull rod, jackstay, and servo-axle sleeve.

Furthermore, the rotor may also be wrapped outside the extended symmetric rotor root axles, leaving certain swinging space for the rotor root axle. The ventilation regions are sealed around the root axle. An opening on the stub wing of the pitch-changing connecting rod seals the elastic material so that the ventilation regions between the stub wing and the pitch-changing connecting rod are sealed to reduce pneumatic resistance and to transfer the transmission of an automatic tripper to the rotor root axle through the pitch-changing connecting rod. The drive that sprays the tank of the rotor or stub wing is equipped with a lubricant tank; during drive operation, the tank provides the engine pump of the drive with lubricant; the lubricant tank is installed in the stub wing or internal hollow cavity of the rotor root axle.

For the super-light helicopter, a propeller-equipped centrifugal force-resistant internal combustion engine may also be fixed on the sides of the rotor root axle and is equipped with a pull rod and a jackstay, one end of which is hinged on the rotor root axle and the other end of which is hinged with the axle sleeve that rotates along with the rotor. The working angle of the rotor is controlled by the pitch-changing device. During application of the control method of gravity center shifting, accurate positioning in the air is realized by the driver and passengers' entire hanging seat. The seat back of the seat next to the driver may be reclined to allow patients to lie down; Turns that are hoisted under the hollow dead axle are installed on top of the hanging seat; The controllable positioning pin and pin hole are installed under the entirely rigid hanging seat. While the flying posture may be controlled by the tail wings after VTOL, the pin on the floor of the super-light helicopter is blocked and opened during taking off or landing; swinging the hanging seat by the strength of the passenger's hands and feet shifts the center of gravity to induce the rotor to tilt together with the fuselage so as to realize accurate positioning in the air. The structure described above is also applicable to helicopters having no empennages.

Due to the adoption of the technological scheme above, the weight and power consumption of both the speed reducer and the tail drive and tail propeller are saved by using a turbine fan, a propeller fan, or a propeller-equipped internal combustion engine as the drives in this invention to propel the rotor head. Comparing this helicopter, which includes an automatic tripper and moveable super-light center of gravity that employs a propeller-equipped internal combustion engine as the drive, with an ordinary helicopter of the same carrying capabilities, the fuel saved by each helicopter is ¼ and ⅓, respectively, of the fuel consumed by a conventional helicopter; The empty weights of the helicopters are reduced by approximately 10% and 20%, respectively, relative to the weights of conventional helicopters; this design permits take-off and landing for fueling stops at ubiquitous commercial gas stations found everywhere; the actual operation costs may be reduced by about half. The super-light helicopter prevents the driver or passengers from breathing in the waste gases emitted by the internal combustion engine. This new system of helicopter propels the rotor directly via drive and provides a helicopter that propels the rotor in the hovering state to satisfy people's requirements. Both the super-light and heavy types of helicopter are adequate for industrial manufacturing.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A helicopter that can directly propel rotors into the hovering state, comprising:
    a fuselage (13) having a center of gravity;
    a rotor (5) with a pull rod and a jackstay (2);
    a turbine (1) comprising a plurality of propellers;
    a pair of wings (14);
    a hollow short shaft (37);
    a hollow short dead axle (36) with a bearing and a base (7), said base having an underside;
    a plurality of throttle lines (35);
    a plurality of wires (34);
    a first fuel delivery pipe (30);
    a hydraulic system;
    an axle sleeve (4); and
    a root axle (3);
wherein
    the turbine (1) directly drives the rotor (5);
    the turbine (1) is installed on the hollow short shaft (37);
    the hollow short shaft (37) is installed inside the hollow short dead axle (36);
    the hollow short dead axle (36) is fixed on the rotor adjacent to a root of the rotor (5);
    the hydraulic system controls a propelling direction of the turbine;
    the throttle lines (35), the wires (34) and the first fuel delivery pipe (30) pass through the hollow short shaft (37) and are received in a crossbeam of the rotor;
    the axle sleeve (4) of the rotor is installed on the hollow dead axle (36), and hinged with the root axle (3) and the pull rod and the jackstay (2);
    the base (7) is offset from the gravity center of the fuselage (13);
    a plurality of pipelines is offset from the base and connected with a control system; and
    steering, outward pushing, positioning and propelling control is provided by a single drive under the plane defined by both wings (14) or by a single drive under the fuselage (13).

2. The helicopter of claim 1, wherein
    the root axle (3) is concentric with an inner axle of the crossbeam of the rotor and hinged with the axle sleeve (4);
    one end of the pull rod and the jackstay (2) is hinged with an axle in the crossbeam of the rotor, and the other side thereof is hinged with the axle sleeve (4).

3. The helicopter of claim 2, wherein
a pitch-changing rotor lock (11) is disposed on sections of sliding keys at the bottom of the axle sleeve (4);
a locking embedded key (9), which is separate from the sliding keys, is disposed in the bottom of the axle sleeve (4);
a key slot segment (12) with increased diameter that is corresponding to the locking embedded key (9) is installed on the base (7), and locked up by a control system of a plectrum plate;
slip rings and chute systems are disposed on the external cylindrical sections of the pitch-changing rotor lock (11);
the pitch-changing rotor lock that can slide up and down is controlled by the control system of a shifting fork or a clamping-type shifting fork.

4. The helicopter of claim 1, wherein
the turbine (1) is fixed by a short shaft system;
the turbine (1) steers by said hydraulic system and functions by adjusting and impelling directions of the helicopter;
under-parts of said rotor (5) are the base of the hollow dead axle (7), and a second rotary fuel delivery pipe (15) and a protection pipe (10) are also passed through which to be interlinked with the axle sleeve (4); the turbine (1) steers a pulling wire of a hydraulic valve or a gas mixture pipe of the turbine (1), throttle wire is led to the underside of the base; the protection pipe (10) is uncovered with a key slot segment (12);
wires are connected to a slip ring, and are conducted by a clamping-type shifting fork control or a pressure carbon brush;
the second rotary fuel delivery pipe (15) is connected with a connector of rotary fuel delivery pipe (6);
if the second rotary fuel delivery pipe (15) is a rotary pipe of gas mixture, a carburetor is equipped therebelow to realize fuel transportation and functional control.

5. The helicopter of claim 4, wherein
steering of the turbine (1) on the rotors or pitch-changing of the propellers is driven by pressure of a fuel delivery pump and controlled by a hydraulic valve;
a hydraulic tank is driven by pressure of the fuel delivery pump so as to enable the turbine (1) to control the propelling direction while the rotor (5) changes into a hovering state and to realize the pitch changing of the propellers.

6. The helicopter of claim 5, further comprising
a plurality of second turbines (16) attached to the wings; wherein
the second turbines (16) are staggered with air stream on a surface of the drive (1) of the rotor (5).

7. The helicopter of claim 6, wherein the air stream on the wings (14) or the second turbines (16) blows over the horizontal empennage and provide propelling, steering and positioning so as to control attitude of the helicopter and flying while rotors change into the hovering state.

8. A helicopter directly propelling rotors into a hovering state with drive, comprising:
a fuselage (13) having a center of gravity;
a rotor (5) comprising two symmetrical blades;
a pair of wings (14);
a propeller with clockwise (CW) and counterclockwise (CCW) rotation functions;
a two-stroke low-emission internal combustion engine;
a plurality of throttle wires (35);
a plurality of second wires (34);
a curling fuel delivery pipe (30);
a root axle (3);
an axle sleeve (4);
a hollow dead axle (21) with a bearing; and
a base (7) having an underside;
wherein
the propeller with CW and CCW rotation function and the two-stroke low-emission internal combustion engine are directly fixed on the rotor adjacent to a root of the rotor (5) to directly drive the rotor (5);
the throttle wires (35), the second wires (34) and the curling fuel delivery pipe (30) pass through a crossbeam and are received in the root axle (3) of the rotor;
the axle sleeve (4) is installed on the hollow dead axle (21) and hinged with the root axle (3);
the base (7) is offset from the center of gravity of the fuselage (13);
a plurality of pipelines is offset from the base and connected with a control system;
steering, positioning and propelling control are provided by a single drive under the plane defined by both wings (14) or by a single drive under the fuselage (13).

9. The helicopter of claim 8, wherein
the internal combustion engine provides lean combustion;
a pair of one-way air valves (17), each having an air throttle, is disposed one on a scavenging port (43) and one on an air passages (20);
a check valve for a gas mixture (18) is disposed at the center of a long mid-way air passage (19) and in the vicinity of the one-way air valve (17);
each air throttle of the one-way air valve (17) is coupled synchronously with that of the check valve of gas mixture (18) so as to shield a gas mixture with the air in a cylinder; and
an air filter is installed outside of the unidirectional air valve.

10. The helicopter of claim 9, wherein the leaked or residual fuel is directly transmitted to the inlet of an air compressor or interval sections in front of the air compressor and the combustor after injection, so as to make it burn in the internal combustion engine along with the air.

11. The helicopter of claim 9, wherein the fuel is directly injected into the cylinder of the internal combustion engine; and small amounts of fuel that leak from coupled parts of the nozzle are led to a scavenging duct through an oil pipe.

12. The helicopter of claim 8, wherein the fuel is directly injected into the cylinder of the internal combustion engine; and small amounts of fuel that leak from coupled parts of the nozzle is led to a scavenging duct through the oil pipe.

13. The helicopter of claim 8, wherein a stub wing (44) is fixed on a rotor head (47) directly.

14. A helicopter capable of propelling rotors directly, comprising:
a turbine or an internal combustion engine (1), comprising a plurality of propellers;
a rotor (5);
a pair of symmetric stub wings (44);
a rotor head (47);
an automatic tripper (46) for tilting the helicopter by means of gravity center shifting; and
a pitch-changing connecting rod (45);
wherein
the turbine or the internal combustion engine (1) is fixed on the rotor (5) or the symmetric stub wings adjacent to the root of the rotor or stub wings to enable rotation about an axis of rotation of the rotor or stub wings;

the stub wings (44) are fixed on the rotor head (47) so as to enable the rotor (5), the automatic tripper (46) and the pitch-changing connecting rod (45) there between to operate together.

15. The helicopter of claim 14, wherein one of the stub wings (44) is wrapped outside a root axle extending from the rotor (5), so that transmission of the automatic tripper (46) is transmitted to the rotor root axle (3) via the pitch-changing connecting rod (45).

16. The helicopter of claim 14, wherein a one of the stub wings (44) is supported by one end of a pull rod and jackstay (2), and the other end thereof is connected with an axle sleeve below the rotor head (47).

17. The helicopter of claim 14, wherein the internal combustion engine (1) is fixed on a side of a root axle (3) and hinged on the root axle (3) via one end of a pull rod and jackstay, and the other end thereof is hinged with an axle sleeve rotating along with the rotor (5).

18. The helicopter of claim 17, wherein a hanging seat (49) in a cabin of the helicopter is disposed below the hollow dead axle (21) to realize accurate positioning in the air by transferring the center of gravity via the strength of the hands and feet of the driver and passengers.

19. The helicopter of claim 18, wherein the internal combustion engine (1) is fixed on a side of a root axle (3) directly; and a working angle of the rotor (5) is controlled by a pitch-changing device so as to realize pneumatic control.

20. The helicopter of claim 19, wherein a controllable positioning pin (53) is installed below an entirely rigid hanging seat (49); and is locked to a floor pin hole (48) of the helicopter after VTOL.

* * * * *